United States Patent [19]

Shimizu et al.

[11] Patent Number: 4,672,411
[45] Date of Patent: Jun. 9, 1987

[54] PRESSURE SENSOR

[75] Inventors: Isao Shimizu; Kazuo Hoya, both of Tamamura, Japan

[73] Assignee: Hitachi, Ltd., Tokyo, Japan

[21] Appl. No.: 681,026

[22] Filed: Dec. 13, 1984

[30] Foreign Application Priority Data

Dec. 16, 1983 [JP] Japan ............................... 58-236152

[51] Int. Cl.[4] ............................................ H01L 27/20
[52] U.S. Cl. ...................................... 357/26; 357/51; 357/55; 357/60
[58] Field of Search ......................... 357/26, 55, 60, 51

[56] References Cited

U.S. PATENT DOCUMENTS

| | | | |
|---|---|---|---|
| 4,314,226 | 2/1982 | Oguro et al. | 357/26 |
| 4,317,126 | 2/1982 | Gragg, Jr. | 357/26 |
| 4,332,000 | 5/1982 | Petersen | 357/26 |
| 4,345,477 | 8/1982 | Johnson | 357/26 |
| 4,516,148 | 5/1985 | Barth | 357/26 |

*Primary Examiner*—William D. Larkins
*Attorney, Agent, or Firm*—Antonelli, Terry & Wands

[57] ABSTRACT

Disclosed is a pressure sensor having a diaphragm formed in a semiconductor body, the diaphragm having at least one pair of pressure sensing semiconductor strips in a major surface thereof. One end of each of the strips is connected to each other by a semiconductor region. The semiconductor region is formed in a direction of small piezoresistive coefficients, and the strips are formed in a direction of great piezoresistive coefficients. Also, the region has a smaller resistance than the resistance of the strips. Also, electrode lead-out regions are provided at the other ends of the strips, which regions have low resistance, extend in a direction of small piezoresistive coefficients, and extend beyond the edge of the diaphram so the electrodes contact the semiconductor body outside the diaphragm. According to the present invention, a pressure sensor of high sensitivity and high precision can be provided.

29 Claims, 18 Drawing Figures

PRESSURE SENSOR

BACKGROUND OF THE INVENTION

The present invention relates to a semiconductor device with pressure sensing elements, and more particularly to a silicon diaphragm type pressure sensor.

Unlike past mechanical pressure sensors employing a Bourdon tube, etc., the semiconductor pressure sensor (having, e.g., a silicon diaphragm) permits microminiaturization, reduced cost and enhanced performance. The silicon diaphragm type pressure sensor is typical of the semiconductor pressure sensor.

The structure of the silicon diaphragm type pressure sensor will be briefly explained. As shown in FIG. 1, a depressed portion 2 is formed by etching the rear surface (side 1B) of a silicon single-crystal substrate 1, so as to provide a membrane or thin-walled portion 3 as a diaphragm, and elongate diffused resistor layers 4 connected into a bridge are disposed in the major surface of the diaphragm 3. When a pressure difference develops in spaces over and under the diaphragm, this diaphragm is deformed in accordance with the pressure difference. Owing to the deformation of the diaphragm, the diffused resistor layers expand or shrink to change their resistances. The pressure sensor senses a pressure change by electrically detecting the change of the resistances.

FIG. 2 is a view showing the structure of a pressure sensing element which has been thought out by the inventors prior to the present invention. As illustrated in the figure, in the silicon diaphragm type pressure sensor, metal electrodes 7 made of aluminum or the like are connected through contact holes 6 to the diffused resistor layer 4 serving as the pressure sensing element.

In the structure of FIG. 2, the diffused resistor layer 4 bent in the shape of the letter U is formed in the major surface ((100) plane) of the diaphragm 3, and it is held in ohmic contact with the aluminum leads 7 through the contact holes 6. The aluminum leads 7 are extended as wiring leads on the front surface of the thick-walled semiconductor body 1 around the diaphragm 3.

The present inventors have recognized that the following problems are involved in the pressure sensor of such structure:

(1) With the U-shaped diffused resistor layer as shown in FIG. 2, the changes of the resistance caused by the deformation of the diaphragm are in a sense opposite to each other comparing the straight parts and the part extending between the straight parts and are canceled, so that the resistance change of the whole diffused resistor becomes small. This will be elucidated with reference to FIG. 4, FIGS. 5(a)-5(c) and FIGS. 6(a)-6(c).

FIG. 4 is a plan view schematically showing the silicon diaphragm portion, and FIGS. 5(a) and 6(a) are sectional views taken along lines A-A' and B-B' in FIG. 4, respectively. Assuming that the diaphragm 3 has been deformed downwards, the resistor 4a of the corner part (that is, the part extending between the two straight parts or, generally, the part extending between the parts which perform an actual pressure sensing operation) undergoes a stress as indicated by arrows in FIG. 5(a). On the other hand, the resistors 4b of the straight parts which perform an actual pressure sensing operation undergo stresses as indicated by arrows in FIG. 6(a). FIGS. 5(b) and 5(c) and FIGS. 6(b) and 6(c) are views which show in plan the changes of the shapes of the respective resistors 4a and 4b before and after the deformation of the diaphragm. As seen from FIGS. 5(b) and 5(c), the resistor 4a has the relations of $W_1 > W_2$ and $R_1 < R_2$, where $W_1$ denotes the width of this resistor before the deformation of the diaphragm and $R_1$ the resistance thereof at that time, and $W_2$ denotes the width of this resistor after the deformation of the diaphragm and $R_2$ the resistance thereof at the time. Meanwhile, as seen from FIGS. 6(b) and 6(c), each resistor 4b has the relations of $W_3 < W_4$ and $R_3 > R_4$ where $W_3$ denotes the width of this resistor before the deformation of the diaphragm and $R_3$ the resistance thereof at that time, and $W_4$ denotes the width of this resistor after the deformation of the diaphragm and $R_4$ the resistance thereof at that time.

Thus, even when the pressure change is sensed as the change of the resistance by the resistors 4b of the straight parts, the resistance change is canceled because the change of the resistance in the resistor 4a of the part extending between the two straight parts is opposite in since to that in the resistor 4b of the straight part. Therefore, the sensitivity of the pressure sensor becomes low.

(2) FIG. 3 is a sectional view taken along line A-A' in FIG. 2. With the structure shown in FIG. 3 wherein aluminum is directly connected to the resistor layer 4 on the silicon diaphragm, there is the problem that a precise pressure measurement is impossible on account of a strain which arises between the aluminum 7 and an oxide film (e.g., $SiO_2$ film) 8 on the silicon surface. More specifically, since the difference between the coefficients of thermal expansion of the aluminum and the $SiO_2$ film is great, the strain of the grain boundary of the aluminum stresses the $SiO_2$ film and the surface of the silicon membrane portion directly below it, with the result that residual strains develop in the diaphragm surface (as indicated by T in FIG. 3). It has been revealed that the residual strains exert the evil effect of causing variation in the characteristics of diaphragm type pressure sensors, etc. and that they set limits to providing a pressure sensor of high precision.

(3) As shown in FIG. 2, the $p^-$-type resistor layer 4 is unitarily formed, and hence, the resistance Ra of the part extending between the two straight parts is comparatively high. Letting Rb denote the resistance of the straight part of the resistor layer 4, and ΔRb denote the variation of the resistance Rb based on the deformation of the silicon diaphragm, the pressure sensitivity α of the pressure sensor is substantially given by the following equation:

$$\alpha = \frac{\Delta Rb + Rb + Ra}{Rb + Ra} \quad (1)$$

As understood from Equation (1), when the resistance Ra is high, the pressure sensitivity α becomes low.

The three problems mentioned above have been found by the inventors.

SUMMARY OF THE INVENTION

The present invention has been made in view of the aforementioned problems, and has for its object to provide a semiconductor pressure sensor which exhibits a high sensitivity and a high performance.

The present invention is constructed as follows:

(1) The resistor region of a part extending between the straight parts, or, generally, the pressure sensing parts, in a pressure sensing resistor is formed along a crystal orientation whose pressure sensitivity is very low (that is, along a crystal orientation of low piezoresistive coefficient in the substrate). Thus, the variation of resistance in the part extending between the, e.g., straight parts is rendered very small, and the variation of resistance in each straight part (termed "pressure sensing strip") of the pressure sensing resistor is detected substantially as it is. For example, in a semiconductor diaphragm type sensor whose major surface is the (100) plane of a silicon single-crystal substrate, the resistor layer of the part extending between the straight parts is formed in the direction of a crystal axis equivalent to <100> or <010>. Such example is illustrative, and not limiting for the present invention.

(2) The contact portions between the pressure sensing resistor layer and Al leads are provided in a surrounding area outside a silicon diaphragm region. Thus, the influence which strains developing near the contact portions exert on a pressure sensing operation is lessened.

(3) The resistor of the part extending between the straight parts in the pressure sensing resistor layer is formed of a p+diffused layer so as to lower the resistance of this part. Thus, the pressure sensitivity is enhanced.

Owing to the above construction, the object of the present invention can be accomplished.

DETAILED DESCRIPTION OF THE INVENTION

Figure 1:
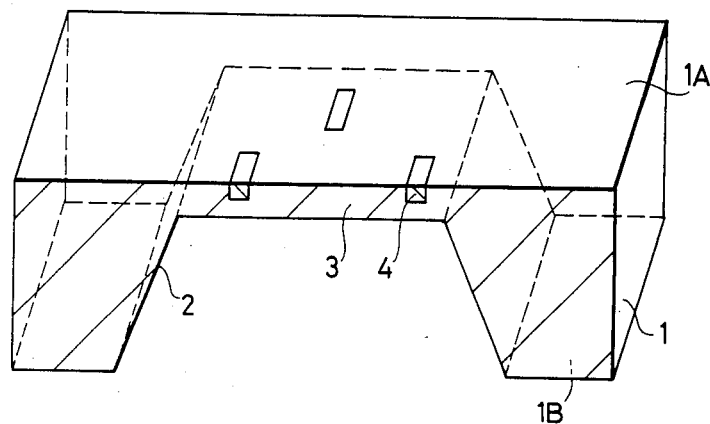
FIG. 1 is a perspective view showing the structure of a silicon diaphragm type pressure sensor.
Figure 2:
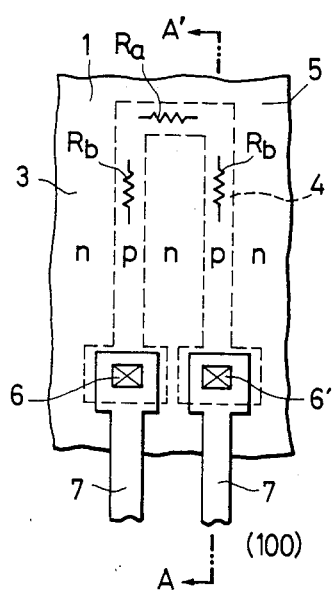
FIG. 2 is a plan view showing the pattern of a diffused resistor in a diaphragm type pressure sensor which was studied by the inventors before the present invention.
Figure 3:
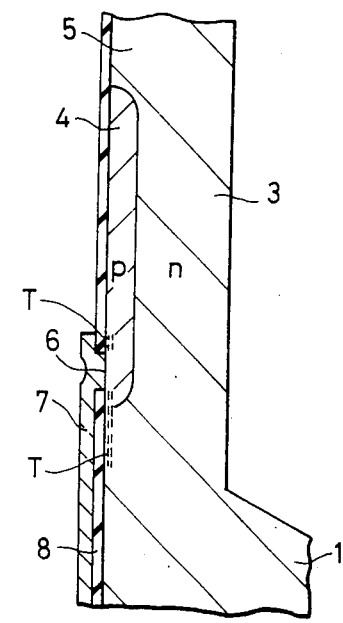
FIG. 3 is a sectional view taken along A-A' in FIG. 2.
Figure 4:
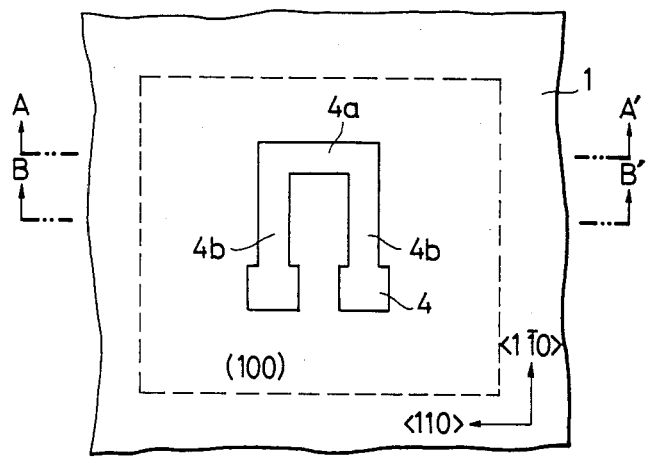
FIG. 4 is a plan view showing the pattern of the resistor shown in FIG. 2, schematically and for elucidating the operation of the resistor.
Figure 5A:
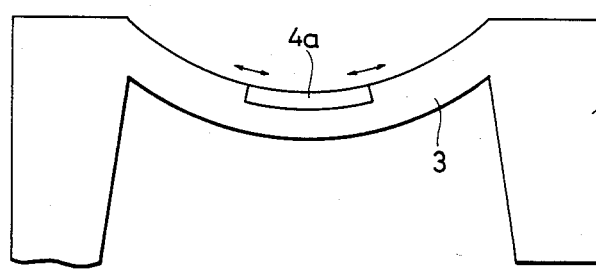
FIGS. 5(a), 5(b) and 5(c) are views for explaining the situation of the change of the resistance of a resistor (4a) in the case where a diaphragm has been deformed downwards in the pressure sensor illustrated in FIG. 4.
Figure 5B:
Figure 5C:
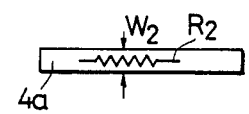
Figure 6A:
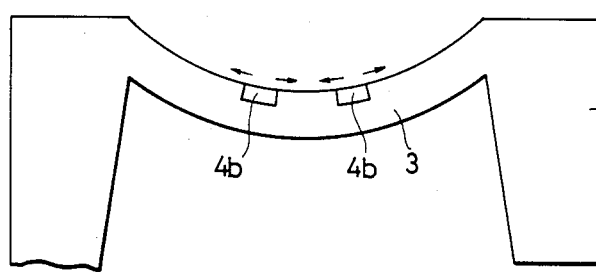
FIGS. 6(a), 6(b) and 6(c) are views for explaining the situation of the change of the resistance of a resistor (4b) in the case where the diaphragm has been deformed downwards in the pressure sensor illustrated in FIG. 4.
Figure 6B:
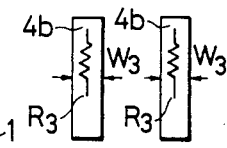
Figure 6C:
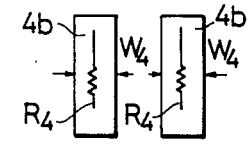
Figure 7:
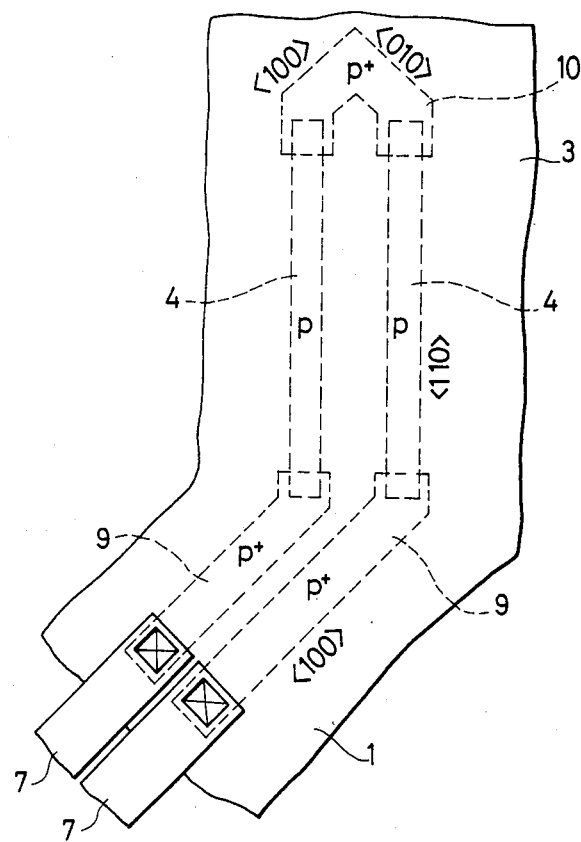
FIG. 7 illustrates one embodiment of the present invention, and is a plan view showing the pattern of diffused resistor layers as well as lead-out portions in a pressure sensor.
Figure 8:
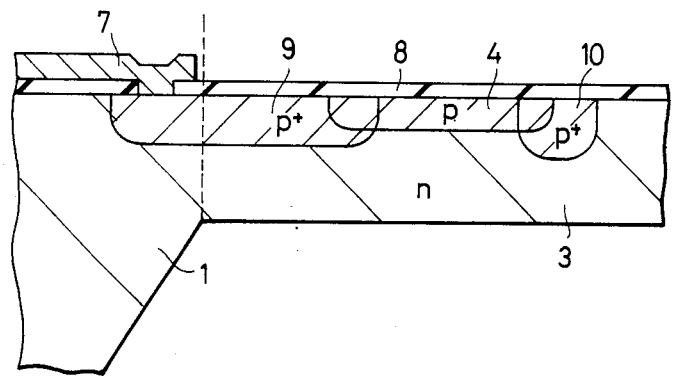
FIG. 8 is a sectional view of the diffused resistor layer as well as the lead-out portion in FIG. 7 as taken along the longitudinal direction thereof.

FIG. 7 illustrates one embodiment of the present invention and is a plan view showing diffused resistor layers 4 as well as lead-out portions 9 in the pressure sensing element of a silicon diaphragm pressure sensor, while FIG. 8 is a sectional view of the diffused resistor layer 4 as well as the lead-out portion 9 on one side shown in FIG. 7, taken along the longitudinal direction thereof.

Each p-type diffused resistor layer 4, having conventional dimensions, is formed using conventional techniques in the major surface (100) of a diaphragm 3 which is made of an n-type semiconductor (e.g., a silicon single-crystal). Each electrode lead-out portion 9 is made of a heavily-doped p+-type diffused layer, and is connected with one end of the corresponding p-type diffused resistor layer by overlapping it. An aluminum lead 7 lies in ohmic contact with the electrode lead-out portion 9 in a place such that the contact is located outside the diaphragm 3 (e.g., in the peripheral part of a semiconductor body 1). The electrode lead-out portions 9 made of the heavily-doped p+-type diffused layers, and a p+ diffused layer 10 forming the corner part (the part extending between the pressure sensing parts) of the pressure sensing element are arrayed in the direction of the crystal axis <100> or <010>.

Figure 9:
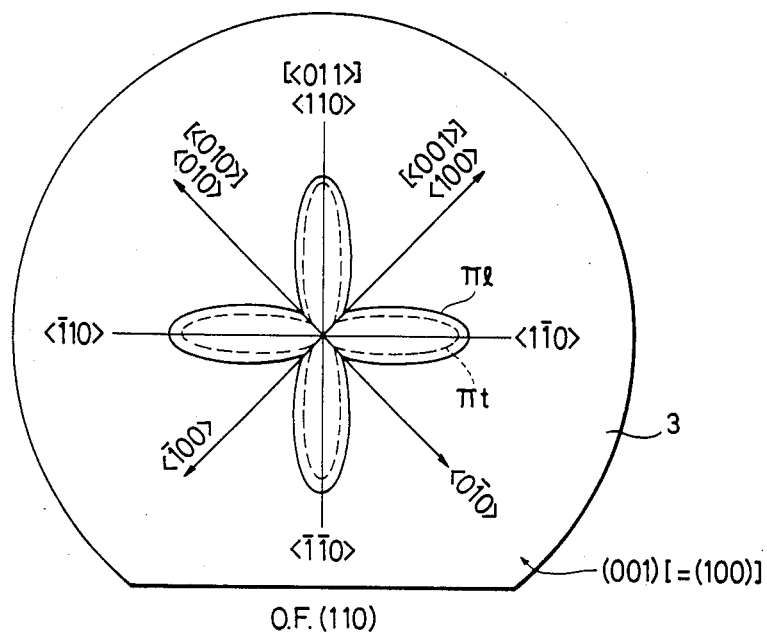
FIG. 9 is a curve diagram showing the orientation dependencies of piezoresistive coefficients in the case where the major surface of the wafer is the (100) plane.

FIG. 9 is a diagram of the orientation-dependence curves of piezoresistive coefficients in the surface of a semiconductor wafer equivalent to the (100) plane. The expression 'surface equivalent to the (100) plane' signifies the (100), (010) and (001) planes and crystal planes parallel thereto. These planes have the same physical properties, and are generally indicated by the representative plane (100) in this specification. The major surface of the semiconductor body 1 (the diaphragm 3) in FIG. 9 is the (001) plane in the concrete. In the figure, parts denoted by [ ] indicate for reference the corresponding crystal orientations in the case where the (100) plane is used as the major surface of the semiconductor body 1 in the concrete.

The pressure sensing resistor undergoes two stresses, in the longitudinal direction of the resistor and in the direction orthogonal thereto, and the piezoresistive coefficients concerning the respective stresses are denoted by $\pi_l$ and $\pi_t$. Letting $\delta_l$ and $\delta_t$ denote the stresses in the longitudinal direction of the resistor and the transverse direction orthogonal thereto, respectively, the pressure sensitivity is expressed by $\alpha = \Delta R/R \alpha \pi_l \delta_l + \pi_t \delta_t$. In FIG. 9, the crystal orientation dependence of the piezoresistive coefficient $\pi_l$ is indicated by a solid line, while that of the piezoresistive coefficient $\pi_t$ is indicated by a dotted line.

As shown in the figure, both the coefficients $\pi_l$ and $\pi_t$ exhibit the maximum values in the directions <110> and <1$\overline{1}$0>. On the other hand, they assume the minimum values in the directions <100> and <010>. Accordingly, the p-type diffused resistor layers 4 (pressure sensing semiconductor strips) which are the straight parts of the pressure sensing element of the embodiment illustrated in FIG. 7 are extended in the direction <110> or <1$\overline{1}$0> in which the maximum resistance variation is exhibited. On the other hand, the heavily-doped p+-type diffused layers 9 serving as the electrode lead-out portions and the p+-type diffused layer 10 for connecting the other ends of the pair of p-type diffused resistor layers 4 are formed in the direction <100> or <010> which define angles of 45 degrees to the aforementioned direction and in which the minimum resistance variation is exhibited.

Since the p-type diffused layer 4 constituting the pressure sensing element has the greatest piezoresistive coefficient, it has its resistance varied greatly by a strain which develops due to the deformation of the silicon diaphragm. That is, it is very sensitive to a pressure or the like. In contrast, since the heavily-doped p+ diffused layers 9 and 10 are arranged in the orientation of the minimum piezoresistive coefficient, they are the most insensitive to a pressure change. With the above construction, the pressure change is detected as the variation of the resistance of the p-type resistor layer 4 sensitively and at high precision, and the reduction of the resistance variation attributed to the heavily-doped p+ diffused layers 9 and 10 is suppressed to be the least. It is therefore possible to provide a silicon diaphragm type pressure sensor of high precision and high reliability.

In addition, the resistor layers other than the resistor layers 4 functioning as the pressure sensing element, that is, the electrode lead-out resistor layers 9 and the resistor layer 10 of the part extending between the straight parts, are formed of the p+ diffused layers of low resistivity in which an impurity is introduced at a high concentration. Therefore, the pressure sensitivity $\alpha$ can be enhanced.

Besides, as shown in FIG. 8, the contact portion between the aluminum electrode 7 and the electrode lead-out resistor layer 9 is not formed in the major surface of the silicon diaphragm 3, but is formed in the peripheral part of the semiconductor body 1 off the diaphragm. Therefore, the influence which is exerted on the deformation of the silicon diaphragm by the residual stress developing in the vicinity of the contact portion can be minimized.

Figure 10:
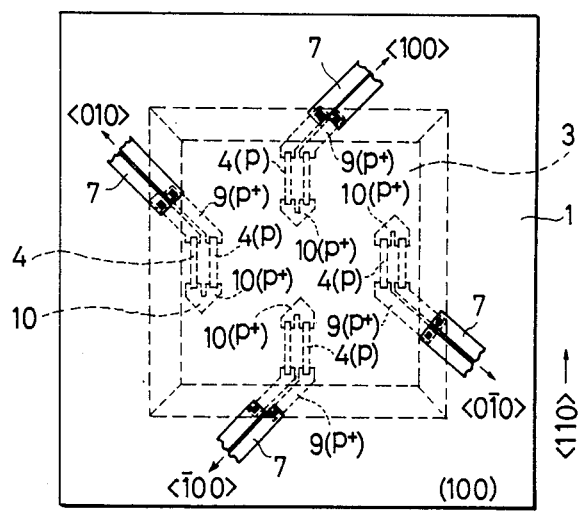
FIG. 10 is a plan view of the upper surface of the pressure sensor.

FIG. 10 is a schematic top view of the diaphragm type pressure sensor. As illustrated in the figure, the pressure sensing elements are disposed in four places, the diffused resistor layers 4 have their longitudinal direction arranged in the direction of the <110> axis, and the heavily-doped diffused lead-out portions 9 and the heavily-doped diffused parts extending between the straight parts are formed by setting their longitudinal directions at the direction of the <100> or <010> axis by a circuit in which the pressure sensing elements in the four places shown in the figure are connected into a bridge by wiring, the resistance variation of the diffused resistor layers resulting from the pressure difference between spaces over and under the diaphragm 3 is electrically detected to measure a pressure.

The arrangement orientations of the resistor layers of the part extending between the straight parts, electrode lead-out portions and pressure sensing portions (straight parts) in the pressure sensing element are not restricted to the orientations mentioned before.

Figure 11:
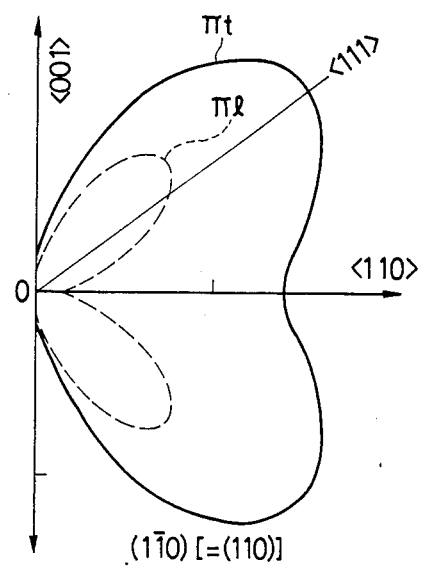
FIG. 11 is a curved diagram showing the orientation dependencies of piezoresistive coefficients in the case where the major surface of the wafer is the (110) plane.

FIG. 11 illustrates the variations of the piezoresistive coefficients $\pi_l$ and $\pi_t$ in the case where the (110) plane (or a plane equivalent to the (110) plane) is employed as the major surface of a semiconductor wafer. The expression "plane equivalent to the (110) plane" signifies the ($1\bar{1}0$), ($\bar{1}10$) and ($\bar{1}\bar{1}0$) planes and planes parallel thereto, and they are generally termed the (110) plane in this specification. Concretely or strictly speaking, the major surface of the semiconductor wafer depicted in FIG. 11 is the ($1\bar{1}0$) plane. As apparent from the figure, in the case of selecting the (110) plane as the major surface of the wafer, the variations of the coefficients $\pi_l$ and $\pi_t$ do not correspond but the coefficient $\pi_t$ varies much more than the coefficient $\pi_l$, unlike the case of the (100) plane. It is also seen that both the variations of the coefficients $\pi_l$ and $\pi_t$ are great in the direction of the <111> crystal axis and that both the coefficients $\pi_l$ and $\pi_t$ are minimized in the direction of the <100> crystal axis.

Figure 12:
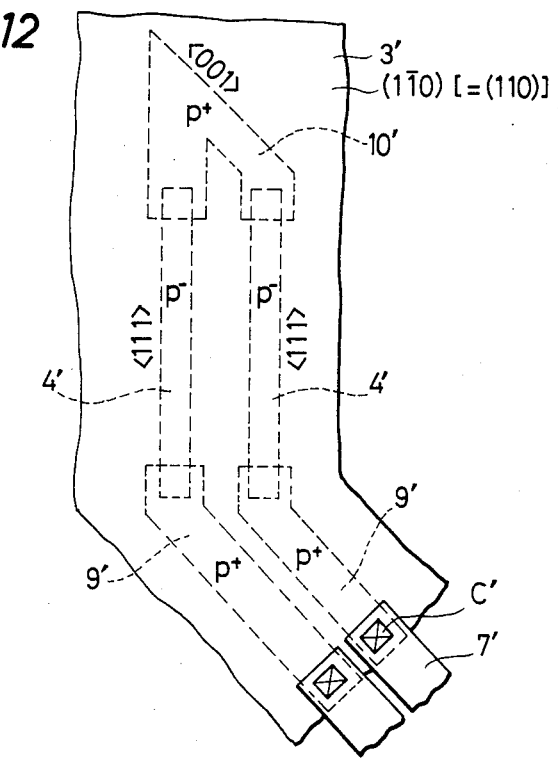
FIG. 12 is a plan view showing the plane pattern of pressure sensing resistor layers in the case where the major surface of the wafer is the (110) plane.

Therefore, when the (110) plane is used as the major surface of the wafer, the pressure sensing element is arranged in orientations illustrated in FIG. 12 by way of example. That is, pressure sensing portions 4' made of p⁻-type diffused resistor layers are arranged in the <111> direction in which the variations of the the piezoresistive coefficients $\pi_l$ and $\pi_t$ are the greatest. On the other hand, a p+-type diffused layer 10' as the part extending between the straight parts (that is, the part extending between the pressure sensing portions) and p+-type diffused layers 9' as the electrode lead-out portions are arranged in the direction of the <001> crystal axis in which the variations of the piezoresistive coefficients are the smallest. As in the prior embodiment, wiring leads 7' made of, e.g., aluminum and the contact portions C' between them and the p+-type diffused layers 9' are provided on the thick-walled part of the semiconductor body outside the silicon diaphragm.

The two embodiments described above bring forth the following effects:

(1) The principal parts of a pressure sensing element are arranged in the crystal orientation of great piezoresistive coefficients, and the resistor layer of a part extending between said principal parts and the resistor layers of electrode lead-out portions are arranged in the orientation of the minimum piezoresistive coefficients, whereby the pressure sensitivity can be sharply enhanced. (2) Since the contact portions between electrodes of Al or the like and the electrode lead-out resistor layers are provided outside a diaphragm (thin-walled part), strains developing in an $SiO_2$ film etc. are prevented from affecting the deformation of the diaphragm, and the pressure sensitivity can be enhanced. (3) The resistor layers of the part extending between the principal parts and the electrode lead-out portions are rendered p+-type of low resistivity, so that a pressure can be detected with high sensitivity.

Figure 13:
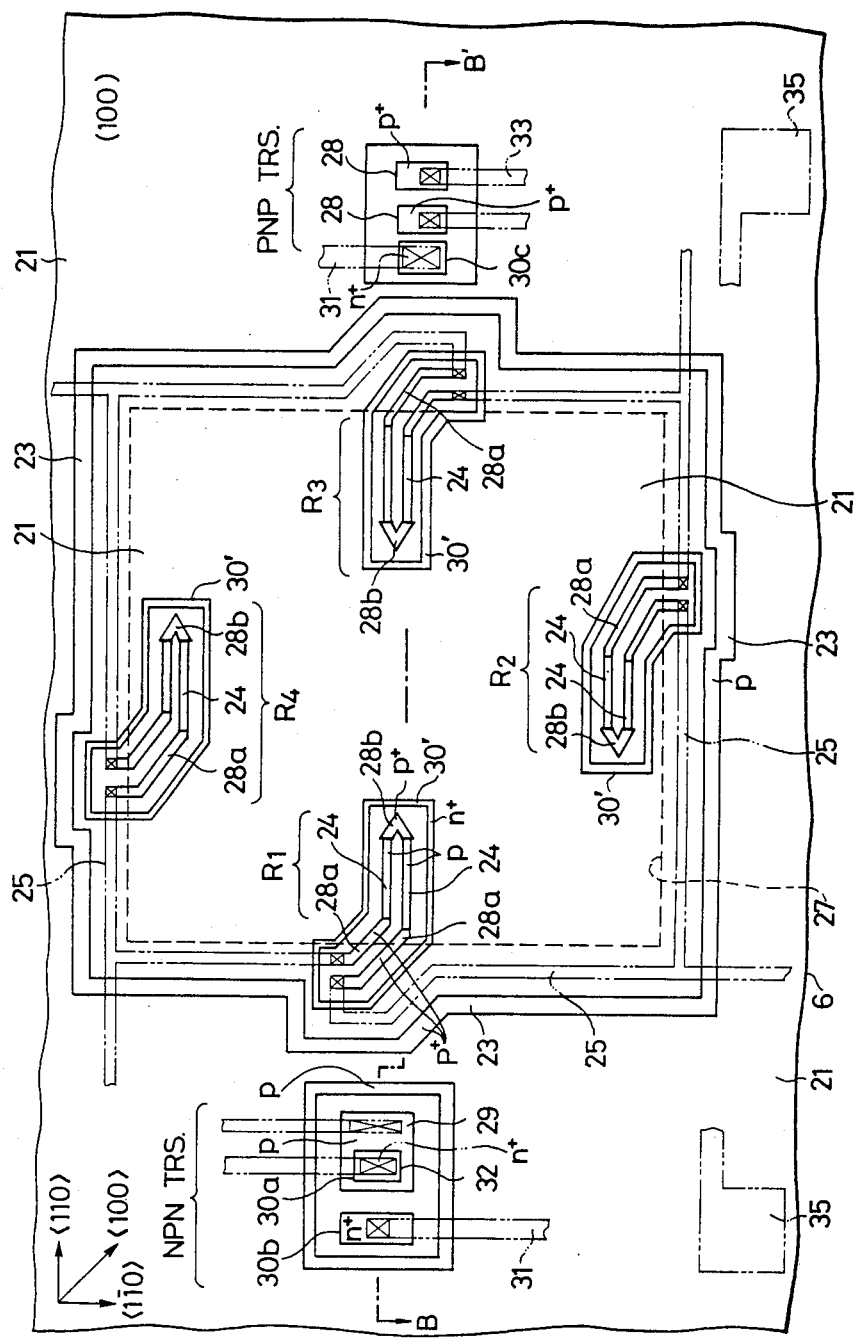
FIG. 13 illustrates still another embodiment of the present invention, and is a plan view of a pressure sensor including active elements.
Figure 14:
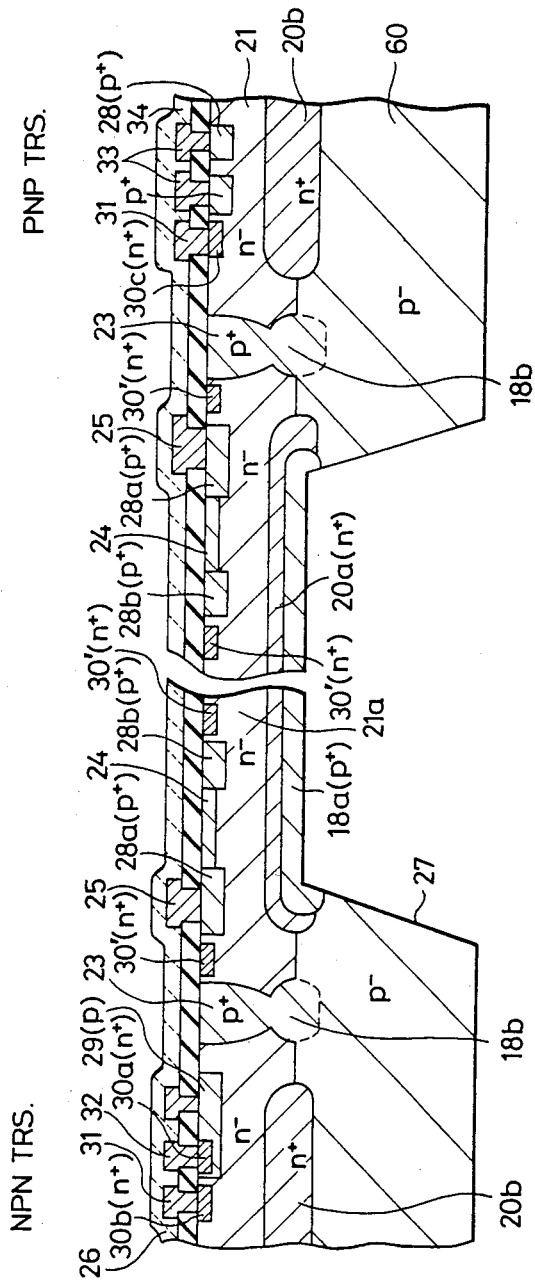
FIG. 14 is a sectional view taken along B-B' in FIG. 13.

FIGS. 13 and 14 show a plan view of a pressure sensor in which pressure sensing elements and other active elements coexist on a single semiconductor body, and a sectional view taken along B—B' in FIG. 13, respectively.

Referring to FIGS. 13 and 14, a depressed portion 27 corresponding to a diaphragm is formed in the rear surface of a Si semiconductor body having the (100) plane (e.g., a body having a Si epitaxial layer 21 and a Si substrate 60) substantially at the central part thereof. A p+-type isolation layer 23 for isolating pressure sensing elements (active elements) is formed, as done conventionally, so as to surround the diaphragm. The respective sides of the diaphragm (27) surrounded with the isolation layer 23 are formed with resistors (diffused resistors) $R_1$, $R_2$, $R_3$ and $R_4$ which are used as the pressure sensing elements. As apparent from FIG. 13, the resistors have the same arrangements and are connected into a bridge by wiring layers 25. Next, the arrangement of each resistor will be explained by taking the resistor $R_1$ as an example.

This resistor $R_1$ is composed of p-type diffused resistor layers 24 (sheet resistance: $100\Omega/\square$) which are formed in the direction of the <110> axis, p+-type diffused layers for contacts 28a (sheet resistance: 30 $\Omega/\square$) which are formed in the direction of the <100> axis inclining by 45 degrees with respect to the <110> axis, and a p+-type diffused layer 28b (sheet resistance: $30\Omega/\square$) which connects the p-type diffused resistor layers 24 extending in parallel with each other. A diffused resistor which extends in the direction of the <110> axis or any axis equivalent thereto exhibits a great piezoresistive effect, and causes a resistance change highly sensitive to the strain of the diaphragm. Especially in the case of the resistor layer exhibiting the pconductivity type, this is remarkable. In contrast, the p+-type diffused layer 28a is in the direction of a small piezoresistive effect (in the direction of the <100> axis or any axis equivalent thereto), and it is heavily doped, so that the fluctuation of its resistance versus the strain of the diaphragm is small and negligible. Further, the p+-type diffused layer 28b is heavily doped. These p+-type diffused layers 28a and 28b are formed simultaneously with the emitter and collector regions 28 of a P-N-P transistor (PNP TRS.). In order to prevent channel leakage between the resistors within the diaphragm, an n+-type diffused layer 30' is formed so as to enclose the p-type diffused resistor layers 24 and the p+-type diffused layers 28a, 28b. Using an n-type impurity such as arsenic (As) or phosphorus (P), the n+-type diffused layers 30' are formed simultaneously with the emitter region 30a and collector contact region 30b of an N-P-N transistor (NPN TRS.) and the base contact region 30c of the P-N-P transistor. The P-N-P transistor and the N-P-N transistor which are located near the periphery of the diaphragm can constitute a temperature compensation circuit, an amplifier circuit or the like, as are known in the art. External lead-out terminals (bondinq pads) 35 are disposed in the periphery of the semiconductor body.

According to this embodiment, the following effects are attained in addition to the effects mentioned before:

(1) A p+-type buried layer 18b (FIG. 14) formed around the sensor portion can finish up an isolation region of small width when coupled with a p+-type diffused layer 23 which extends from the front surface of an epitaxial n-type Si layer. Therefore, the occupying area of the isolation region can be reduced, and a semiconductor device having a high density of integration can be produced. (2) n+-type buried layers can be utilized as parts of active elements (the collector of the N-P-N transistor, the base of the lateral P-N-P transistor) in peripheral portions. (3) A Si membrane portion or diaphragm can be sufficiently thickened by rendering the epitaxial n-type Si layer thick, whereby even a sensor applicable to a high pressure (100 Torr or above) can be manufactured at high precision. (4) An IC in which active elements of high withstand voltage and a pressure sensor applicable to a high pressure are integrally combined can be realized by the use of a thick n-type Si layer.

The present invention is applicable to any of silicon diaphragm type pressure sensors employing p-type diffused resistor layers and diaphragm type pressure sensors including ICs.

The pressure sensor according to the present invention is very effective when applied to pressure control circuits in an automobile, a musical instrument, etc.

While we have shown and described several embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. A semiconductor pressure sensor comprising:
    (1) a pair of pressure sensing semiconductor strips which are formed in one major surface of a semiconductor substrate, each of said strips having two ends;
    (2) a semiconductor connection region which is formed in said one major surface and which electrically connects one end of each of said pair of pressure sensing semiconductor strips to each other; and
    (3) a pair of electrodes which are formed in contact with said one major surface of said semiconductor substrate, to provide electrical connection to the other end of each of said pair of pressure sensing semiconductor strips,
    wherein said pressure sensing semiconductor strips have their longitudinal directions arranged in a direction in which piezoresistive coefficients in the substrate are great, and said semiconductor connection region has its longitudinal direction arranged in a direction in which the piezoresistive coefficients in the substrate are small.

2. A pressure sensor according to claim 1, wherein the resistance of said strips is greater than a resistance of said semiconductor region.

3. A semiconductor pressure sensor comprising:
    (a) a semiconductor body having a major surface, the major surface extending across a thin section of the semiconductor body and a thick section of said body;
    (b) a pair of pressure sensing semiconductor strips formed in said thin section, in said major surface thereof, wherein said pressure sensing semiconductor strips have their longitudinal direction arranged in a direction in which piezoresistive coefficients in said substrate are great, and said semiconductor connection regions have their respective longitudinal directions arranged in directions in which the piezoresistive coefficients in said substrate are small;
    (c) semiconductor connection regions, connected to the ends of the strips, said semiconductor connection regions each extending from the thin section of the semiconductor body to the thick section of the semiconductor body; and
    (d) a pair of electrodes to be in electrical connection to respective ones of the strips, with each electrode contacting a respective semiconductor connection region on the thick section,
    whereby electrical contact to the strips can be made without positioning the electrodes on the thin section.

4. A pressure sensor according to claim 3, wherein said semiconductor body is covered with an insulator layer, with said insulator having an opening there-through for contact of the electrodes to the respective semiconductor connection region.

5. A pressure sensor according to claim 4, wherein said semiconductor body is made of silicon, said insulator layer is made of Si02, and said electrodes are made of aluminum.

6. A pressure sensor according to claim 5, wherein the electrodes are formed by depositing aluminum on the insulator layer and through an opening therein for said contact.

7. A semiconductor pressure sensor comprising:
 (a) a semiconductor body having a major surface, the major surface extending across thin section of the semiconductor body and a thick section of said body;
 (b) a pair of pressure sensing semiconductor strips formed in said thin section, in said major surface thereof, wherein said pressure sensing semiconductor strips have their longitudinal direction arranged in a direction in which pizeoresistive coefficients in said substrate are great, and said semiconductor connection regions have their respective longitudinal directions arranged in directions in which the piezoresistive coefficients in said substrate are small;
 (c) semiconductor connection regions, connected to the ends of the strips, said semiconductor connection regions each extending from the thin section of the semiconductor body to the thick section of the semiconductor body, the semiconductor connetion regions having a lower resistance than the resistance of said strips; and
 (d) a pair of electrodes to be in electrical connection to respective ones of the strips, with each electrode contacting a respective semiconductor connection region on the thick section,
 whereby electrical contact to the strips can be made without positioning the electrodes on the thin section.

8. A semiconductor pressure sensor comprising:
 (1) a pair of pressure sensing semiconductor strips which are formed in one major surfaceof a semiconductor substrate;
 (2) a first semiconductor connection region which is formed in said one major surface and which electrically connects ends of said pair of pressure sensing semiconductor strips on one side to each other;
 (3) a pair of electrodes which are formed in contact with said one major surface of said semiconductor substrate, to provide electrical connection to said pair of pressure sensing semiconductor strips;
 (4) a second semiconductor connection region which electrically connects the other end of one of said pair of pressure sensing semiconductor strips and one of said pair of electrodes; and
 (5) a third semiconductor connection region which electrically connects the other end of the other of said pair of pressure sensing semiconductor strips and the other of said pair of electrodes;
 wherein said pressure sensing semiconductor strips have their longitudinal direction arranged in a direction in which piezoresistive coefficients in said substrate are great, and said first, second and third semiconductor connection regions have their respective longitudinal directions arranged in directions in which the piezoresistive coefficients in said substrate are small.

9. A pressure sensor according to claim 8, wherein resistances of said first, second and third semiconductor connection regions are lower than a resistance of said pressure sensing semiconductor strips.

10. A pressure sensor according to claim 9, wherein said pressure sensing semiconductor strips are made of $p^-$-type diffused layers, and said first, second and third semiconductor connection regions are made of $p^+$-type diffused layers.

11. A pressure sensor according to claim 8, wherein said pressure sensing semiconductor strips are made of $p^-$-type diffused layers, and said first, second and third semiconductor connection regions are made of $p^+$-type diffused layers.

12. A pressure sensor according to claim 8, wherein said one major surface of said semiconductor substrate is the (100) crystal plane or a plane equivalent thereto, said pressure sensing semiconductor strips have their longitudinal directions arranged in the direction of the <110> or <110> crystal axis, and said first, second and third semiconductor connection regions have their respective longitudinal directions arranged in the direction of the <100> or <010> crystal axis.

13. A pressure sensor according to claim 8, wherein said one major surface of said semiconductor substrate is the (110) crystal plane or a plane equivalent thereto, said pressure sensing semiconductor strips have their longitudinal directions arranged in the direction of the <111> crystal axis, and said first, second and third semiconductor connection regions have their respective longitudinal directions arranged in the direction of <001> or <110> crystal axis.

14. A pressure sensor according to claim 8, wherein said semiconductor substrate is of silicon.

15. A pressure sensor according to claim 8, wherein said electrodes are made of aluminum.

16. A pressure sensor according to claim 8, further comprising an isolation layer which is formed so as to extend from said major surface of said semiconductor substrate down to a rear surface thereof and to surround said pressure sensing semiconductor strips,
 wherein an active element is formed in that part of said semiconductor substrate which is isolated by said isolation layer from the part of said semiconductor substrate formed with said pressure sensing semiconductor strips.

17. A pressure sensor according to claim 16, wherein said isolation layer is an isolation layer containing diffused impurities.

18. A pressure sensor according to claim 16, wherein said active element is a P-N-P transistor or an N-P-N transistor.

19. A pressure sensor comprising:
 (1) a thin-walled region, which is formed in a part of a semiconductor body having a major surface, and whose vertical thickness relative to said major surface is smaller than a vertical thickness of the other part of said semiconductor body;
 (2) a pair of pressure sensing semiconductor strips which are formed in said major surface of said thin-walled region;
 (3) a first semiconductor connection region which is formed in said major surface of said thin-walled region and which electrically connects ends of said pair of pressure sensing semiconductor strips on one side to each other;
 (4) a pair of electrodes which are formed in contact with said major surface, to provide electrical connection to said pair of pressure sensing semiconductor strips;

(5) a second semiconductor connection region which electrically connects the other end of one of said pair of pressure sensing semiconductor strips and one of said pair of electrodes; and (6) a third semiconductor connection region which electrically connects the other end of the other of said pair of pressure sensing semiconductor strips and the other of said pair of electrodes;

wherein said pressure sensing semiconductor strips have their longitudinal direction arranged in a direction in which piezoresistive coefficients in said thin-walled region are great, and said first, second and third semiconductor connection regions have their respective longitudinal directions arranged in directions in which the piezoresistive coefficients in said thin-walled region are small.

20. A pressure sensor according to claim 19, wherein a contact portion between said second semiconductor connection region and the corresponding electrode, and a contact portion between said third semiconductor connection region and the corresponding electrode are provided on said major surface of said semiconductor body outside said thin-walled region.

21. A pressure sensor according to claim 19, wherein resistances of said first, second and third semiconductor connection regions are lower than a resistance of said pressure sensing semiconductor strips.

22. A pressure sensor according to claim 19, wherein said pressure sensing semiconductor strips are mzde of p⁻-type diffused layers, and said first, second and third semiconductor connection regions are made of p⁺-type diffused layers.

23. A pressure sensor according to claim 19, wherein said major surface of said thin-walled region is the (100) crystal plane or a plane equivalent thereto, said pressure sensing semiconductor strips have their longitudinal directions arranged in the direction of the $<110>$ or $<110>$ crystal axis, and said first, second and third semiconductor connection regions have their respective longitudinal directions arranged in the direction of the $<100>$ or $<010>$ crystal axis.

24. A pressure sensor according to claim 19, wherein said one major surface of said thin-walled region is the (110) crystal plane or a plane equivalent thereto, said pressure sensing semiconductor strips have their longitudinal directions arranged in the direction of the $<111>$ crystal axis, and said first, second and third semiconductor connection regions have their respective longitudinal directions arranged in the direction of the $<001>$ or $<110>$ crystal axis.

25. A pressure sensor according to claim 19, wherein said semiconductor body is of silicon.

26. A pressure sensor according to claim 19, wherein said electrodes are made of aluminum.

27. A pressure sensor according to claim 19, further comprising an isolation layer which is formed so as to extend from the major surface of said semiconductor body down to a rear surface thereof and to surround said pressure sensing semiconductor strips, wherein an active element is formed in that part of said semiconductor body which is isolated by said isolation layer from the part of said semiconductor body formed with said pressure sensing semiconductor strips.

28. A pressure sensor according to claim 27, wherein the isolation layer is an isolation layer containing diffused impurities.

29. A pressure sensor according to claim 27, wherein said active element is a P-N-P transistor or an N-P-N transistor.

* * * * *